(12) United States Patent
Ahn et al.

(10) Patent No.: US 12,387,632 B2
(45) Date of Patent: Aug. 12, 2025

(54) IMAGE DISPLAY DEVICE USING SENSOR

(71) Applicants: Hyundai Motor Company, Seoul (KR); Kia Corporation, Seoul (KR)

(72) Inventors: Byoung Suk Ahn, Whasung-Si (KR); Joon Bo Shim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 575 days.

(21) Appl. No.: 17/859,666

(22) Filed: Jul. 7, 2022

(65) Prior Publication Data
US 2023/0045270 A1 Feb. 9, 2023

(30) Foreign Application Priority Data

Aug. 5, 2021 (KR) .................. 10-2021-0103413

(51) Int. Cl.
*G09F 11/10* (2006.01)
*G01S 7/481* (2006.01)
*G01S 17/06* (2006.01)
*G09F 9/37* (2006.01)

(52) U.S. Cl.
CPC ............ *G09F 11/10* (2013.01); *G01S 7/4813* (2013.01); *G01S 7/4817* (2013.01); *G01S 17/06* (2013.01); *G09F 9/37* (2013.01)

(58) Field of Classification Search
None
See application file for complete search history.

(56) References Cited

U.S. PATENT DOCUMENTS

| | | | |
|---|---|---|---|
| 10,042,042 B2 | 8/2018 | Miremadi | |
| 10,394,345 B2 | 8/2019 | Donnelly et al. | |
| 2018/0292916 A1* | 10/2018 | Donnelly | ................ G01S 17/89 |
| 2022/0292967 A1* | 9/2022 | Kawashima | .......... G01S 17/931 |

FOREIGN PATENT DOCUMENTS

| | | |
|---|---|---|
| KR | 10-2106339 | 5/2020 |
| KR | 10-2020-0070151 | 6/2020 |

* cited by examiner

*Primary Examiner* — Samira Monshi
(74) *Attorney, Agent, or Firm* — Morgan, Lewis & Bockius LLP

(57) ABSTRACT

A display image device includes a sensor in which when a surrounding object is detected through a scanning unit, an image display unit operates together with and the image for message delivery to an outside is implemented, so that Light Detection and Ranging (LiDAR) sensing function and image implementation may be integrated, a package may be reduced and a LiDAR sensing area may be secured.

17 Claims, 6 Drawing Sheets

IMAGE DISPLAY DEVICE USING SENSOR

CROSS REFERENCE TO RELATED APPLICATION

The present application claims priority to Korean Patent Application No. 10-2021-0103413, filed Aug. 5, 2021, the entire contents of which is incorporated herein for all purposes by this reference.

BACKGROUND OF THE PRESENT DISCLOSURE

Field of the Present Disclosure

The present disclosure relates to an image display device using a sensor that implements an image for message delivery to an outside using a LiDAR.

Description of Related Art

Recently, in the mobility including a vehicle or a mobile robot, a laser radar device such as a light detection and ranging (LiDAR) is used to detect a surrounding terrain or object.

Since such LiDAR irradiates laser light into a surrounding area and utilizes the time, intensity and the like of the reflected light which is reflected from a surrounding object or terrain, it measures the distance, speed, and shape of the object to be measured, or precisely scans the surrounding object or terrain.

In the case of a robotaxi among the mobility, a display capable of exchanging information with an outside is provided. Furthermore, the LiDAR is applied and provided on a top portion of the mobility to expand sensing accuracy and sensing range.

Accordingly, there is a problem in that the display and the LiDAR are respectively provided on the top portion of the mobility, and the display interferes with the sensing region of the LiDAR, reducing the sensing area.

Furthermore, as the LiDAR and the display are provided separately, it is difficult to secure a space for installing the LiDAR and the display in a limited space on the top portion of the mobility.

Furthermore, when the LiDAR and the display are separately provided, a cost is increased.

Furthermore, as the display is configured in a way of simply projecting an image, there is a problem in that the image is distorted due to the formation of water droplets.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an image display device using a sensor that implements an image for message delivery to an outside using a LiDAR.

In various aspects of the present disclosure, an image display device using a sensor according to an exemplary embodiment of the present disclosure includes a housing which is configured to be rotatable; a scanning unit that detects a surrounding object when the housing rotates; an image display unit which is provided on a side surface of the housing and includes a plurality of light sources each individually lighting; and a control unit that is configured to rotate the housing when sensing of the surrounding object or generating of an image is required, and controls to turn ON/OFF each light source of the image display unit in generating the image on the side surface of the housing by afterimage effect caused by the rotation of the housing.

The housing is formed in a shape of cylinder and a part of the side surface is formed to allow light transmission, and the scanning unit includes a light receiving unit to receive laser light and a light emitting unit to irradiate the laser light.

The scanning unit and the image display unit are spaced apart along the side surface of the housing and arranged so that the image display unit does not overlap a sensing area of the scanning unit.

The plurality of light sources of the image display unit is arranged in a vertical direction of the housing.

The control unit is configured to rotate the housing at a preset sensing speed when sensing of the surrounding object is required, rotates the housing at a preset image generation speed when generating of the image is required, and controls to turn ON/OFF each light source according to the image to be generated.

The control unit is configured to rotate the housing at the image generation speed when sensing of the surrounding object and generating of the image are required at a same time.

The image display unit is composed of a plurality and the plurality of image display units is spaced apart along the side surface of the housing.

The image display units are spaced at equal intervals and arranged so as not to overlap a sensing area of the scanning unit.

A number of the image display units is determined by comparing a rotation speed of the housing at which the scanning unit is configured for sensing and the rotation speed of the housing at which the image display unit is configured for generating the image and according to a difference in rotation speeds required for operations of the scanning unit and the image display unit.

The control unit is configured to operate one of the plurality of image display units in sensing the surrounding object when a rotation speed of the housing is greater than or equal to an image generation speed.

When the rotation speed of the housing is less than the image generation speed, the control unit increases a number of operations of the image display units according to a difference between the rotation speed of the housing and the image generation speed in sensing the surrounding object.

In the image display device using a sensor configured as described above, when the surrounding object is detected through the scanning unit, the image display device operates together with and the image for message delivery to the outside is implemented. Thus, the LiDAR sensing function and image implementation may be integrated, the package may be reduced and the LiDAR sensing area may be secured.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
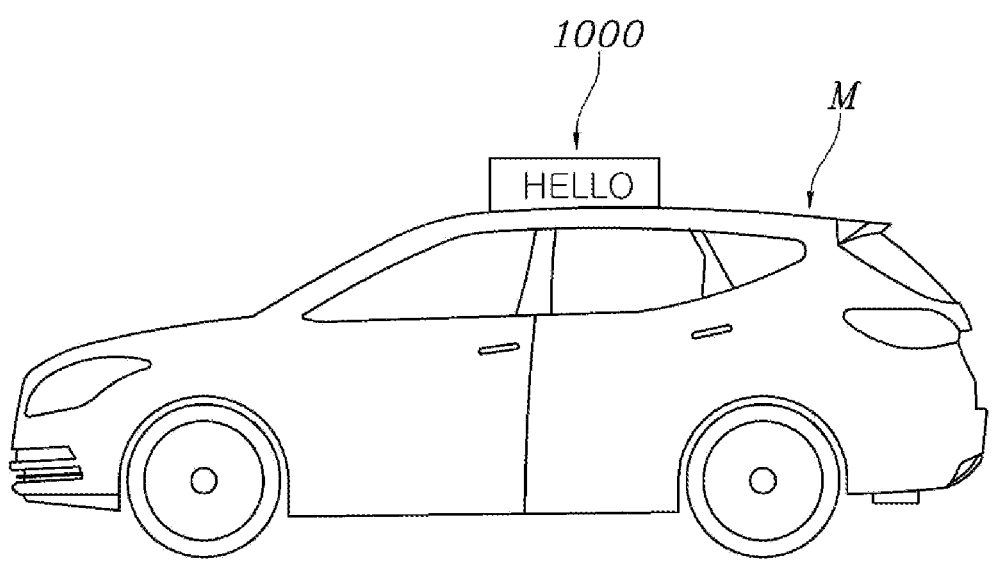
FIG. 1 is a view showing a mobility according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an image display device using a sensor according to various exemplary embodiments of the present disclosure will be described with reference to the accompanying drawings.

Figure 2:
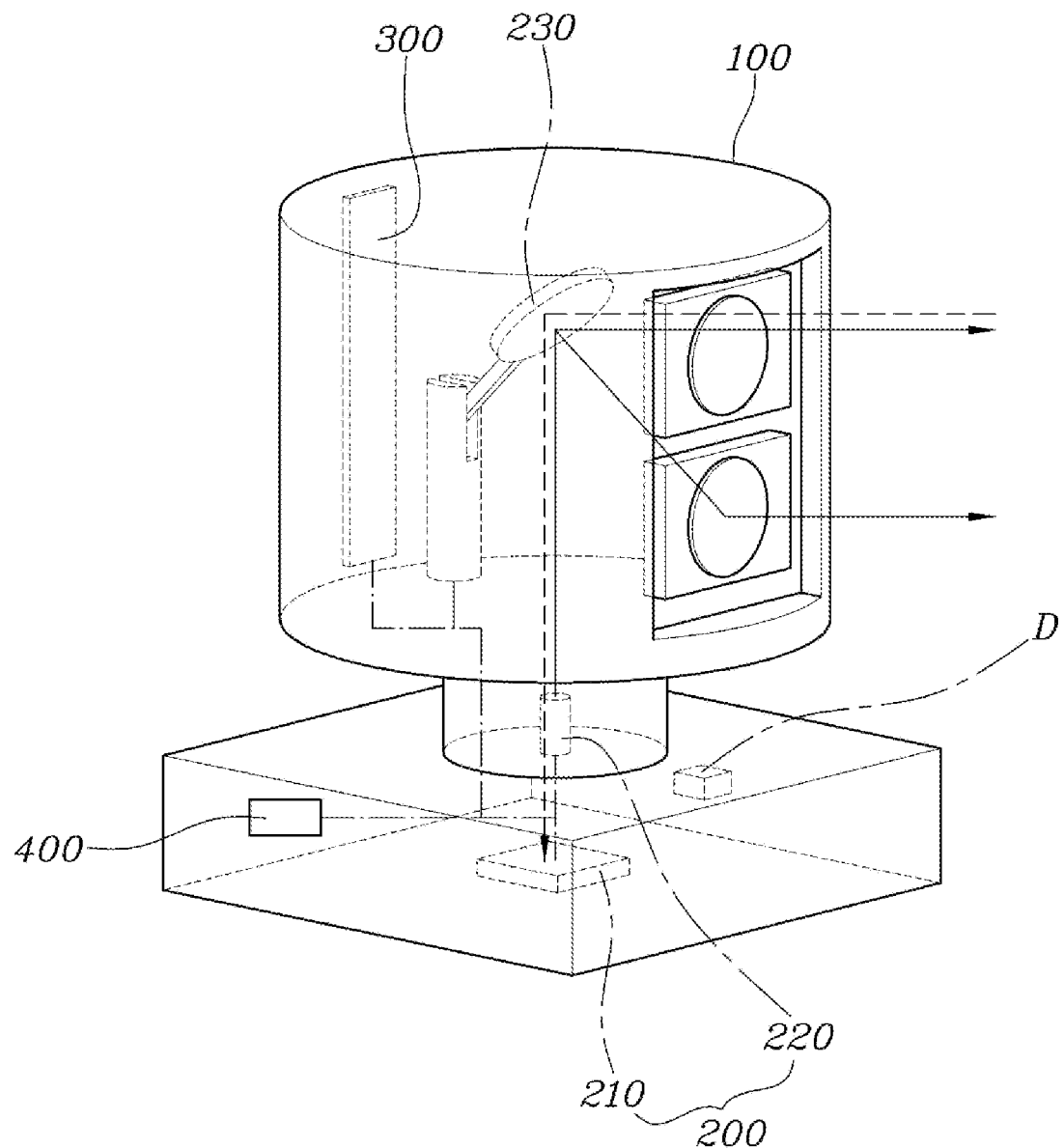
FIG. 2 is a view showing an image display device using a sensor according to various exemplary embodiments of the present disclosure.
Figure 3:
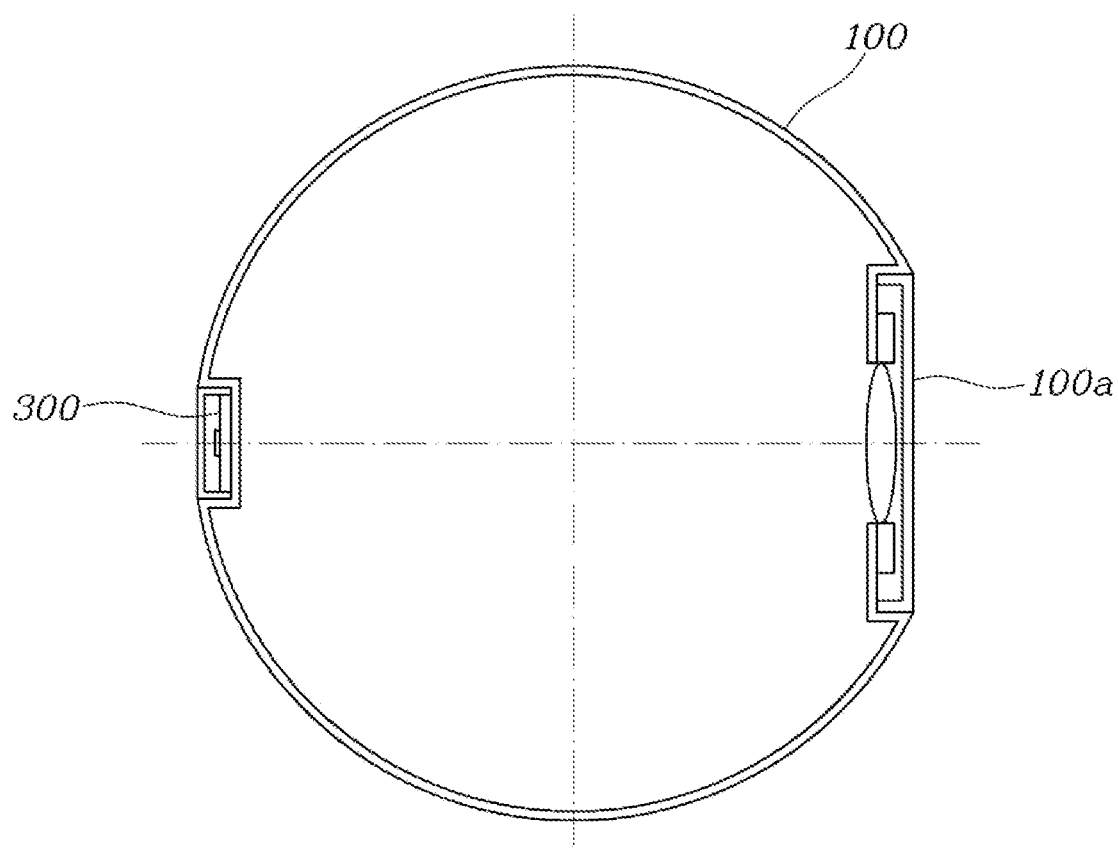
FIG. 3 is a view for explaining the image display device using a sensor shown in FIG. 2.
Figure 4:
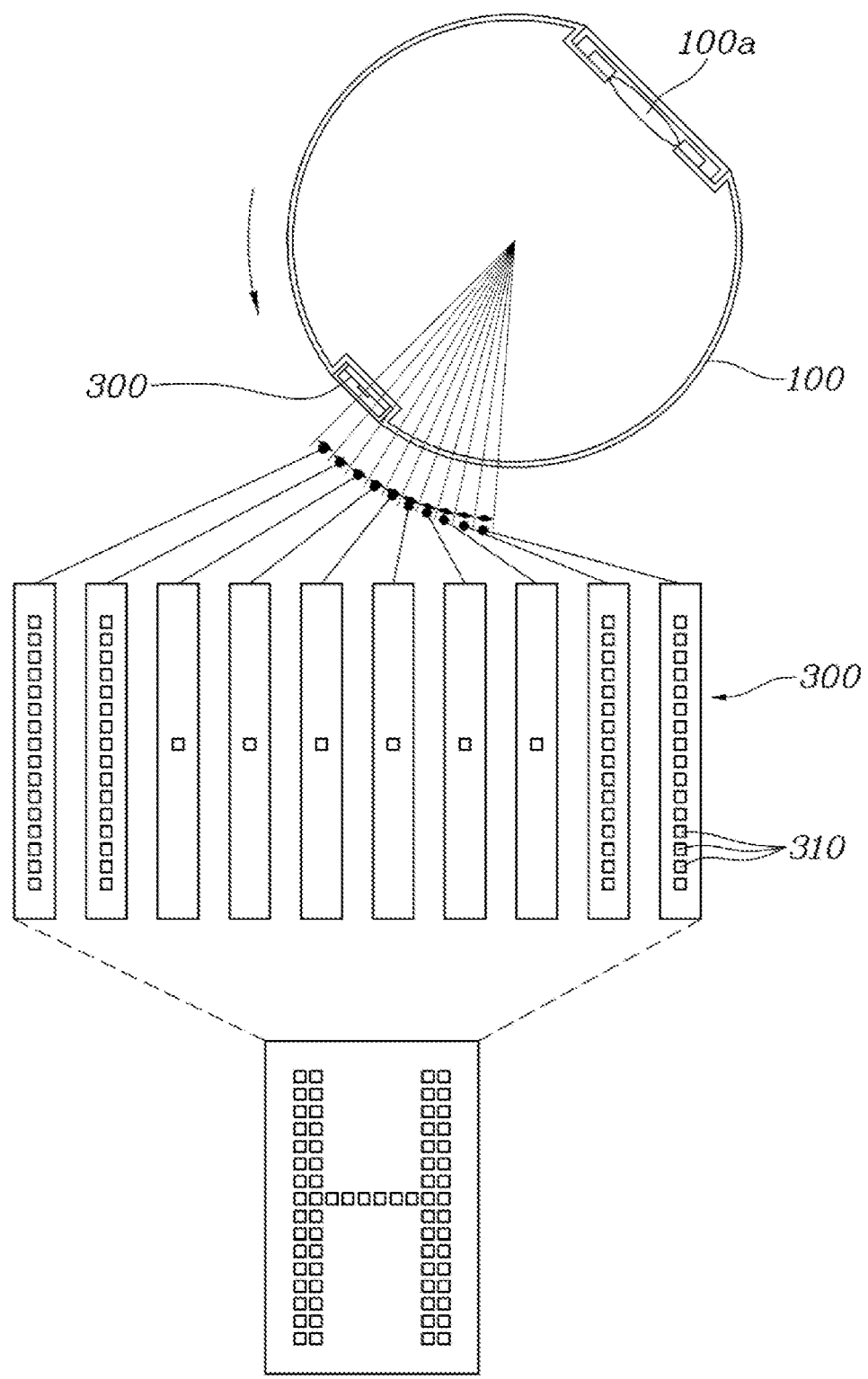
FIG. 4 is a view for explaining image generation of the present disclosure.
Figure 5:
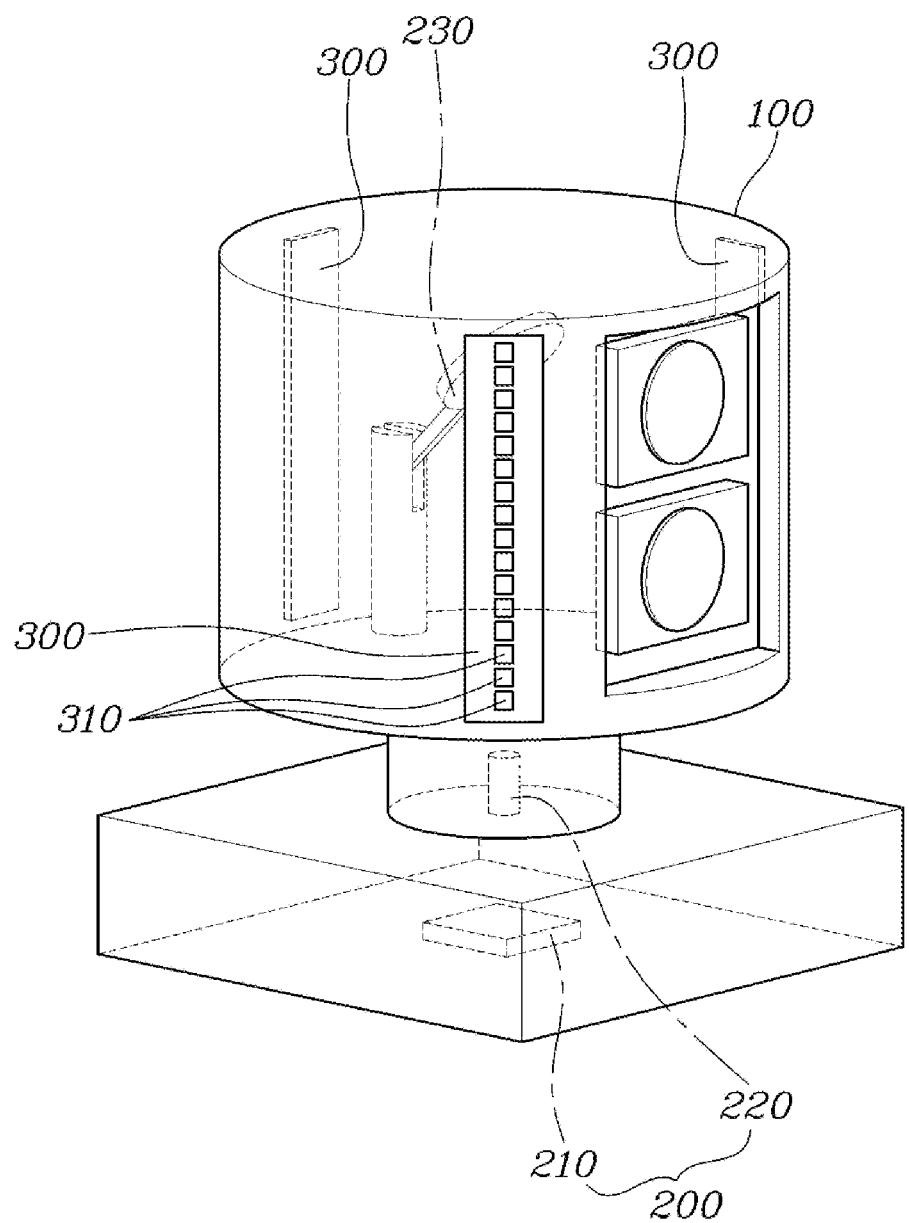
FIG. 5 is a view showing an image display device using a sensor according to various exemplary embodiments of the present disclosure.
Figure 6:
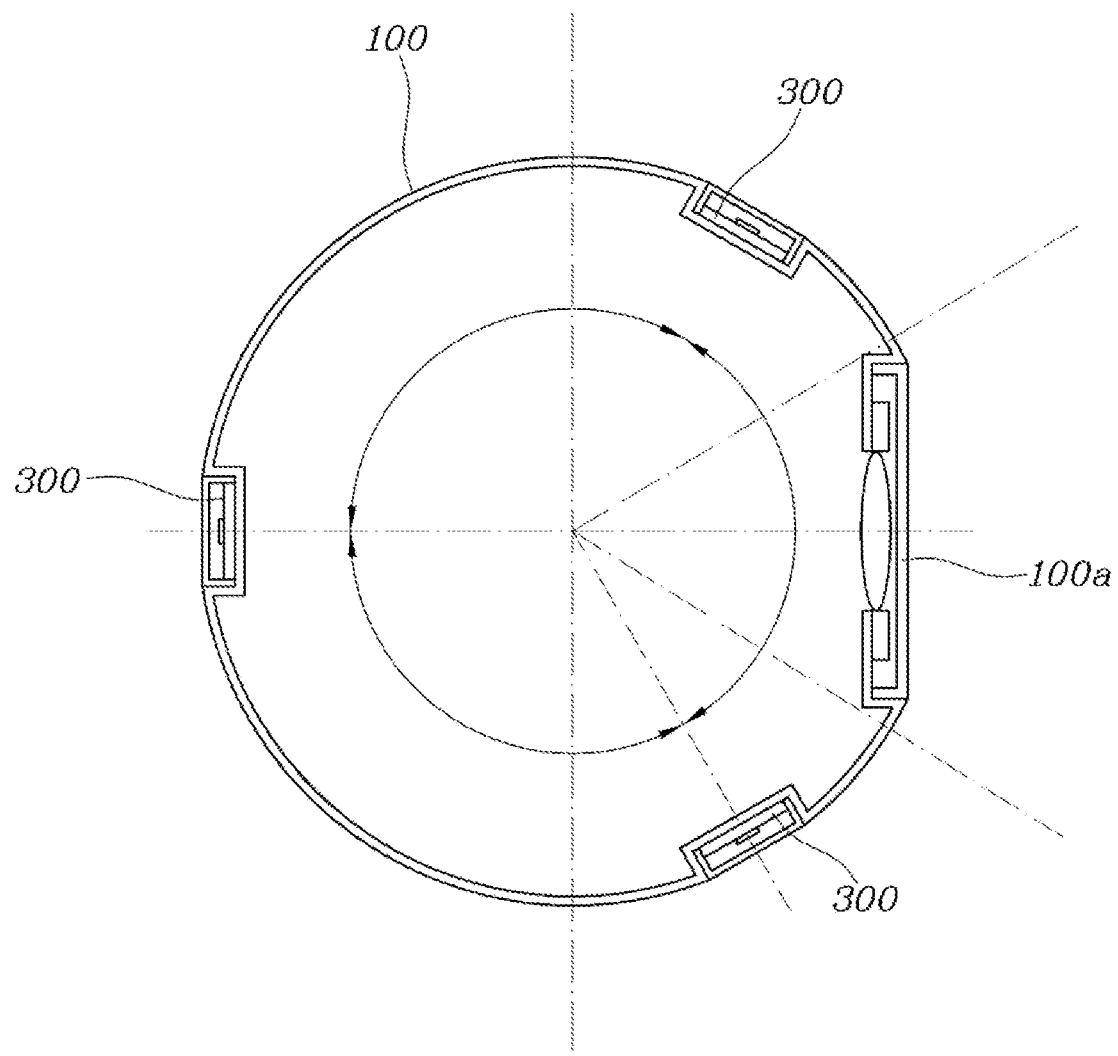
FIG. 6 is a view for explaining the image display device using a sensor shown in FIG. 5.

FIG. 1 is a view showing a mobility according to an exemplary embodiment of the present disclosure, FIG. 2 is a view showing an image display device using a sensor according to various exemplary embodiments of the present disclosure, FIG. 3 is a view for explaining the image display device using a sensor shown in FIG. 2, FIG. 4 is a view for explaining image generation of the present disclosure, FIG. 5 is a view showing an image display device using a sensor according to various exemplary embodiments of the present disclosure, and FIG. 6 is a view for explaining the image display device using a sensor shown in FIG. 5.

As shown in FIG. 1 and FIG. 2, an image display device 1000 using a sensor according to an exemplary embodiment of the present disclosure includes a housing 100 which is configured to be rotatable; a scanning unit 200 which is provided inside the housing 100 and detects a surrounding object when the housing 100 rotates; an image display unit 300 which is provided on a side surface of the housing 100 and configured to include a plurality of light sources 310 each light source individually lighting; and a control unit 400 that rotates the housing 100 when sensing of the surrounding object or generating of an image is required, and controls to turn ON/OFF each light source 310 of the image display unit 300 in generating the image on the side surface of the housing by afterimage effect caused by the rotation of the housing.

Here, the housing 100 may be provided on a top portion of a mobility M, and is configured to be rotated by a driving motor D in a rotatably provided on the mobility M.

The scanning unit 200 is configured for a light detection and ranging (LiDAR), and detects a surrounding object when the housing 100 rotates.

That is, the housing 100 is formed in a shape of cylinder, and is formed so that light passes through a part of the side surface thereof, and the scanning unit 200 includes a light receiving unit 210 to receive laser light and a light emitting unit 220 to irradiate the laser light.

Accordingly, the housing 100 is formed in a shape of cylinder so that the upper and side surfaces of the housing 100 are closed, and a part of the side surface may be provided with a window 100a made of a light-transmitting material through which the laser light irradiated from the scanning unit 200 passes.

The scanning unit 200 is provided inside the housing 100, and the scanning unit 200 includes the light receiving unit 210 to receive laser light and the light emitting unit 220 to irradiate the laser light. Here, a reflective mirror 230 may be disposed in the scanning unit 200 to easily receive and emit the laser light in a limited space inside the housing 100. Furthermore, the reflective mirror 230 may be configured as a micro electro mechanical system (MEMS) mirror so that the laser light can accurately reach a target point.

On the other hand, the side surface of the housing 100 is further provided with the image display unit 300 in which each of the light sources 310 individually emits light. Here, each light source 310 of the image display unit 300 may include an LED, and as each light source 310 is individually turned on, a specific image may be formed when the housing 100 rotates.

The image display unit 300 may be configured so that the plurality of light sources 310 is arranged in the vertical direction of the housing 100. In the present way, as each light source 310 is arranged in a straight line in the image display unit 300, the image display unit 300 is formed in a straight line, so that it is easy to be provided in the housing 100. Furthermore, each light source 310 of the image display unit 300 is turned on when the housing 100 rotates, which gives the afterimage effect, so that it is easy to implement an image according to the lighting position of each light source 310.

The scanning unit 200 and the image display unit 300 as described above may be spaced apart along the side surface of the housing 100, but may be disposed so that the image display unit 300 does not overlap the sensing area of the scanning unit 200.

As shown in FIG. 3, the scanning unit 200 and the image display unit 300 are spaced from each other on the side surface of the housing 100, so that the image display unit 300 does not interfere with the sensing area of the scanning unit 200. Therefore, accurate sensing is possible through the scanning unit 200.

Accordingly, the image display unit 300 and the scanning unit 200 are spaced from each other on the side surface of the housing 100 in 180° direction, and the information display function through the image display unit 300 and the sensing function through the scanning unit 200 can be implemented without mutual interference.

Through this, the control unit 400 rotates the housing 100 when sensing of the surrounding object or generating of an image is required.

That is, the control unit 400 rotates the housing 100 when the sensing of the surrounding object is required, so that the scanning unit 200 provided in the housing 100 detects the surrounding object, and receives information on the object detected through the scanning unit 200.

Furthermore, the control unit 400 rotates the housing 100 when generating of an image is required, and controls to turn ON/OFF of each light source 310 of the image display unit 300 to generate an image on the side surface of the housing 100 by the afterimage effect caused by the rotation of the housing 100.

For example, when expressing a word 'H', the control unit 400 controls to turn ON/OFF each light source 310 of the image display unit 300 at a position where an image is to be generated, while rotating the housing 100. That is, as shown in FIG. 4, as each light source 310 of the image display unit 300 is turned ON/OFF in accordance with the rotation of the housing 100, the word 'H' is formed at a position where an image is to be generated.

In the present way, the control unit 400 receives image information to be generated when generating of an image is required and controls to turn ON/OFF each light source 310 and the rotation of the housing 100, and thus, as each light source 310 of the image display unit 300 is turned on according to the rotation of the housing 100, a required image may be generated on the external surface of the housing 100.

As described above, in an exemplary embodiment of the present disclosure, the scanning unit 200 and the image display unit 300 are configured in the housing 100, so that when the housing 100 rotates, the sensing function through the scanning unit 200 and the information display function through the image display unit 300 are implemented together.

Meanwhile, various embodiments of the present disclosure will be referred to as follows.

As various exemplary embodiments of the present disclosure, when the scanning unit 200 and the single image display unit 300 are provided in the housing 100, the control unit 400 may perform the control as follows.

The control unit 400 rotates the housing 100 at a preset sensing speed when sensing of a surrounding object is required, rotates the housing 100 at a preset image generation speed when generating of an image is required, and controls to turn ON/OFF each light source 310 according to the image to be generated.

Accordingly, the sensing speed and the image generation speed for rotating the housing 100 are pre-stored in the control unit 400. Here, the sensing speed is the rotation speed of the housing 100 at which the scanning unit 200 can detect a surrounding object, and the image generation speed is the rotation speed of the housing 100 at which an image may be generated when each light source 310 of the image display unit 300 is turned on.

For example, the scanning unit 200 includes a Light Detection and Ranging (LiDAR), and in accordance with the sensing performance of the LiDAR, the rotation speed of the housing 100 may be required to be 300 to 900 rpm.

Meanwhile, the rotation speed of the housing 100 required when the image display unit 300 is interlocked with the rotation of the housing 100 to generate an image through the afterimage effect may be 900 rpm. of course, in the case of the image display unit 300, even when the rotation speed of the housing 100 is less than 900 rpm, an image may be generated, but since a frame is lowered and the sharpness of the image is reduced, the rotation speed of the housing 100 is preferably 900 revolutions per minute (rpm) or more.

Accordingly, since the rotation speed of the housing 100 required for sensing by the scanning unit 200 and the rotation speed of the housing 100 required for generating an image by the image display unit 300 are different from each other, the sensing speed and the image generation rate may be stored in the control unit 400, respectively.

Through this, the control unit 400 rotates the housing 100 at a preset sensing speed when sensing of a surrounding object is required so that sensing of the surrounding object is performed through the scanning unit 200. When generating of an image is required, the control unit 400 rotates the housing 100 at a preset image generation speed and controls to turn ON/OFF each light source 310 according to the image to be generated, so that the image generation may be performed through the image display unit 300.

On the other hand, the control unit 400 rotates the housing 100 at the image generation speed when sensing of a surrounding object and generating of an image are required at the same time.

The sensing speed of the housing 100 for sensing a surrounding object is relatively lower than an image generation speed of the housing 100 for generating an image. Accordingly, when the housing 100 rotates at a sensing speed in a state where sensing of a surrounding object and generating of an image are required at the same time, the sharpness of the image generated through the image display unit 300 may deteriorate.

Accordingly, the control unit 400 rotates the housing 100 at the image generation speed when sensing of a surrounding object and generating of an image are requested at the same time, so that both the sensing function through the scanning unit 200 and the image generation through the image display unit 300 may be implemented smoothly.

On the other hand, as various exemplary embodiments of the present disclosure, the image display unit 300 may be composed of a plurality, the plurality of image display units may be arranged spaced apart along the side surface of the housing 100.

As shown in FIG. 5 and FIG. 6, as the image display unit 300 is configured in plurality, the sharpness of the image by the image display unit 300 is increased when the housing 100 rotates.

Furthermore, even if the housing 100 rotates at the rotation speed for the operation of the scanning unit 200, a clear image may be generated without increasing the rotation speed of the housing 100 as the plurality of image display units 300 generate the image.

The image display units 300 may be spaced apart at equal intervals and disposed so as not to overlap the sensing area of the scanning unit 200.

As may be seen in FIG. 6, the plurality of image display units 300 is spaced apart on the side surface of the housing 100 at equal intervals, so that when the housing 100 rotates, the image generated by lighting of each light source 310 of each image display unit 300 may be implemented with clarity. Furthermore, as the plurality of image display units 300 is spaced from each other at equal intervals, control of each image display unit 300 for generating a specific image may be accurately performed according to a predetermined rule.

Furthermore, the scanning unit 200 is disposed between the plurality of image display units 300 spaced apart. In the instant case, the scanning unit 200 is disposed between the respective image display units 300 so that the sensing area does not interfere with the image display unit 300 to accurately perform that sensing through the scanning unit 200.

On the other hand, the number of the image display units 300 may be determined by comparing the rotation speed of the housing 100 at which the scanning unit 200 is configured for sensing with the rotation speed of the housing 100 at which the image display unit 300 is configured for generating an image, and according to a difference in the rotation speeds required for operations of the scanning unit 200 and the image display unit 300.

For example, the scanning unit 200 includes a Light Detection and Ranging (LiDAR), and in accordance with the sensing performance of the LiDAR, the rotation speed of the housing 100 may be required to be 300 to 900 rpm. Furthermore, the image display unit 300 is interlocked with the rotation of the housing 100 so that the rotation speed of the housing 100 required to generate an image through the afterimage effect may be 900 rpm.

Accordingly, for the image display unit 300 to generate a clear image, the housing 100 must rotate at 900 rpm, but when the housing 100 rotates at 300 revolutions per minute (rpm) to implement the sensing function of the LiDAR, there is a problem in image generation.

Accordingly, the number of the image display units 300 may be determined to be three or more so that the rotation speed of the housing 100 corresponds to 900 revolutions per minute (rpm) to generate a clear image even when the housing 100 rotates at 300 rpm. Accordingly, even when the housing 100 rotates at 300 rpm, an image may be clearly generated by the three or more image display units 300. These three image display units 300 may be spaced at intervals of 120° on the side surface of the housing 100.

On the other hand, the control unit 400 receives information according to the rotation speed of the housing 100, and the image generation speed according to the rotation speed of the housing 100 is prestored in the control unit 400 when generating an image, and when the rotation speed of the housing 100 is greater than or equal to the image generation speed in sensing a surrounding object, the control unit 400 operates any one of the plurality of image display units 300.

Here, the control unit 400 may receive information according to the rotation speed of the housing 100 through a speed sensor provided in the housing 100. Furthermore, the image generation speed prestored in the control unit 400 may be the rotation speed of the housing 100 at which a clear image may be generated according to the specifications of the image display unit 300 when the housing 100 rotates.

That is, the rotation speed of the housing 100 may be changed according to the sensing situation of the LiDAR forming the scanning unit 200. Since the number of installations of the image display units 300 is determined based on the lowest rotation speed of the LiDAR, a plurality of image display units 300 may be selectively operated.

Accordingly, the control unit 400 receives the rotation speed of the housing 100 when sensing a surrounding object, and when the rotation speed of the housing 100 is greater than or equal to the image generation speed, and operates only any one of the plurality of image display units 300. That is, when the rotation speed of the housing 100 is greater than or equal to the image generation speed, a clear image may be generated even if only one image display unit 300 is operated, and thus, the remaining image display units 300 are not operated. Therefore, all of the plurality of image display units 300 may be operated at all times, but to ensure a durability of each image display unit 300 and to generate a constant image, the control unit 400 controls the plurality of image display units 300 to be selectively operated according to the rotation speed of the housing 100.

On the other hand, when the rotation speed of the housing 100 is less than the image generation speed when sensing the surrounding object, the control unit 400 may increase the number of operations of the image display units 300 according to the difference between the rotation speed of the housing 100 and the image generation speed when sensing the surrounding object.

That is, when the rotation speed of the housing 100 due to sensing the surrounding object through the scanning unit 200 is less than the image generation speed, the sharpness of the image generated through the image display unit 300 may be lowered. Accordingly, the difference between the rotation speed required for sensing and the rotation speed required for image generation is resolved by increasing the number of operations of the image display units 300.

For example, in the case in which the image generation speed stored in the control unit 400 is 900 rpm, when the housing 100 rotates at 300 rpm according to sensing of a surrounding object, three image display units 300 are operated so that the clarity of the image generated by the image display unit 300 may be ensured.

In the image display device using a sensor configured as described above, when the surrounding object is detected through the scanning unit, the image display device operates together with and the image for message delivery to the outside is implemented. Thus, the LiDAR sensing function and image implementation may be integrated, the package may be reduced and the LiDAR sensing area may be secured.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An image display apparatus using a sensor, the image display apparatus comprising:
    a housing which is configured to be rotatable;
    a scanning unit that detects a surrounding object when the housing rotates;
    an image display unit which is provided on a side surface of the housing and includes a plurality of light sources each individually lighting;
    a driving unit configured for rotating the housing; and
    a control unit that is configured to rotate the housing by control of the driving unit when sensing of the surrounding object or generating of an image is required, and to control to turn ON/OFF each light source of the image display unit in generating the image on the side surface of the housing by afterimage effect caused by the rotation of the housing,
    wherein the scanning unit includes a light receiving unit to receive laser light and a light emitting unit to irradiate the laser light.

2. The image display apparatus of claim 1, wherein the housing is formed in a shape of cylinder and a part of the side surface is formed to allow light transmission.

3. The image display apparatus of claim 1, further including a reflective mirror disposed in the scanning unit to receive and emit the laser light inside the housing.

4. The image display apparatus of claim 1, wherein the scanning unit and the image display unit are spaced apart along the side surface of the housing and arranged so that the image display unit does not overlap a sensing area of the scanning unit.

5. The image display apparatus of claim 1, wherein the plurality of light sources of the image display unit is arranged in a vertical direction of the housing.

6. The image display apparatus of claim 1, wherein the control unit is configured to rotate the housing at a preset sensing speed when sensing of the surrounding object is required, to rotate the housing at a preset image generation speed when generating of the image is required, and to control to turn ON/OFF each light source according to the image to be generated.

7. The image display apparatus of claim 6, wherein the control unit is configured to rotate the housing at the image generation speed when sensing of the surrounding object and generating of the image are required at a same time.

8. The image display apparatus of claim 1, wherein the image display unit is composed of a plurality and the plurality of image display units is spaced apart along the side surface of the housing.

9. The image display apparatus of claim 8, wherein the image display units are spaced at equal intervals and arranged so as not to overlap a sensing area of the scanning unit.

10. The image display apparatus of claim 8, wherein a number of the image display units is determined by comparing a rotation speed of the housing at which the scanning unit is configured for sensing and the rotation speed of the housing at which the image display unit is configured for generating the image and according to a difference in rotation speeds required for operations of the scanning unit and the image display unit.

11. The image display apparatus of claim 10, wherein the number of the image display units is determined based on a lowest rotation speed of the scanning unit.

12. The image display apparatus of claim 8, wherein the control unit is configured to operate one of the plurality of image display units in sensing the surrounding object when a rotation speed of the housing is greater than or equal to an image generation speed.

13. The image display apparatus of claim 12, wherein when the rotation speed of the housing is less than the image generation speed, the control unit is configured to increase a number of operations of the image display units according to a difference between the rotation speed of the housing and the image generation speed in sensing the surrounding object.

14. A method of controlling an image display apparatus including a housing, a scanning unit, and a plurality of image display units spaced apart along a side surface of the housing, the method comprising:
    operating, by a control unit, one of the plurality of image display units in sensing a surrounding image when a rotation speed of the housing is greater than or equal to an image generation speed.

15. The method of claim 14, further including:
    when the rotation speed of the housing is less than the image generation speed, increasing, by the control unit, a number of operations of the image display units according to a difference between the rotation speed of the housing and the image generation speed in sensing the surrounding object.

16. A non-transitory computer readable storage medium on which a program for performing the method of claim 14 is recorded.

17. An image display apparatus using a sensor, the image display apparatus comprising:
- a housing which is configured to be rotatable;
- a scanning unit that detects a surrounding object when the housing rotates;
- an image display unit which is provided on a side surface of the housing and includes a plurality of light sources each individually lighting;
- a driving unit configured for rotating the housing; and
- a control unit that is configured to rotate the housing by control of the driving unit when sensing of the surrounding object or generating of an image is required, and to control to turn ON/OFF each light source of the image display unit in generating the image on the side surface of the housing by afterimage effect caused by the rotation of the housing,
- wherein the image display unit is composed of a plurality and the plurality of image display units is spaced apart along the side surface of the housing.

* * * * *